(12) United States Patent
Wang

(10) Patent No.: US 10,131,125 B2
(45) Date of Patent: Nov. 20, 2018

(54) METHOD OF FORMING THREE-DIMENSIONAL COMPOSITE

(71) Applicant: CHAEI HSIN ENTERPRISE CO., LTD., Taichung (TW)

(72) Inventor: Shui Mu Wang, Taichung (TW)

(73) Assignee: CHAEI HSIN ENTERPRISE CO., LTD., Taichung (TW)

( * ) Notice: Subject to any disclaimer, the term of this patent is extended or adjusted under 35 U.S.C. 154(b) by 200 days.

(21) Appl. No.: 15/256,622

(22) Filed: Sep. 5, 2016

(65) Prior Publication Data

US 2018/0065353 A1 Mar. 8, 2018

(51) Int. Cl.
| | |
|---|---|
| B32B 37/10 | (2006.01) |
| B32B 37/06 | (2006.01) |
| B32B 37/12 | (2006.01) |
| B29C 65/10 | (2006.01) |
| B29C 65/48 | (2006.01) |
| B29D 35/00 | (2010.01) |
| B29L 31/50 | (2006.01) |
| B29C 65/08 | (2006.01) |

(Continued)

(52) U.S. Cl.
CPC .......... *B32B 37/1018* (2013.01); *B29C 65/10* (2013.01); *B29C 65/48* (2013.01); *B29D 35/00* (2013.01); *B32B 37/06* (2013.01); *B32B 37/12* (2013.01); *B29C 65/008* (2013.01); *B29C 65/08* (2013.01); *B29C 65/14* (2013.01); *B29C 65/4815* (2013.01); *B29C 65/72* (2013.01); *B29C 66/00145* (2013.01); *B29C 66/1122* (2013.01); *B29C 66/30325* (2013.01); *B29C 66/30326* (2013.01); *B29C 66/532* (2013.01); *B29C 66/63* (2013.01); *B29C 66/71* (2013.01); *B29C 66/723* (2013.01); *B29C 66/729* (2013.01); *B29C 66/7294* (2013.01); *B29C 66/7332* (2013.01); *B29C 66/7392* (2013.01); *B29C 66/7484* (2013.01); *B29C 2795/002* (2013.01); *B29L 2031/505* (2013.01); *B32B 2367/00* (2013.01); *B32B 2375/00* (2013.01); *B32B 2437/02* (2013.01)

(58) Field of Classification Search
CPC ..... B32B 37/1018; B32B 37/06; B32B 37/12; B32B 2367/00; B32B 2437/02; B32B 2375/00; B29C 65/10; B29C 65/18; B29C 66/474; B29C 65/48; B29K 2667/00
See application file for complete search history.

(56) References Cited

U.S. PATENT DOCUMENTS

2016/0031164 A1\* 2/2016 Downs .................. B29C 70/542
428/12

\* cited by examiner

*Primary Examiner* — Vishal I Patel

(57) ABSTRACT

A method of forming three-dimensional composite comprising steps of: (a) manufacturing at least one shaping member; (b) fitting each of the at least one shaping member on each of at least one mold; (c) adhering at least one connection sheet on said each shaping member so as to form each of at least one semi-finished product; (d) fixing said each semi-finished product in a cavity; and (e) heating said each semi-finished product and vacuuming the cavity. Said shaping member has at least one orifice and covers said each mold, and each connection sheet has a substrate and an adhesive layer, a melting point of the adhesive layer is less than the substrate. Said each semi-finished product in the cavity is heated until the adhesive layer melts, and the cavity is vacuumed so that the adhesive layer penetrates into said each shaping member, thus producing a three-dimensional finished product.

16 Claims, 14 Drawing Sheets

(51) Int. Cl.
*B29C 65/14* (2006.01)
*B29C 65/72* (2006.01)
*B29C 65/00* (2006.01)

METHOD OF FORMING THREE-DIMENSIONAL COMPOSITE

FIELD OF THE INVENTION

The present invention relates to a method of forming composite which manufactures the three-dimensional composite easily and quickly at low production cost.

BACKGROUND OF THE INVENTION

A conventional method of forming three-dimensional composite (such as shoe vamp) contains steps of:

(a) cutting multiple connection sheets corresponding to a plurality of parts of a shoe vamp; and (b) sewing the multiple connection sheets together and onto a shoe tree so as to produce a finished vamp.

However, such a method is complicated and the finished vamp is produced at high fabrication cost.

The present invention has arisen to mitigate and/or obviate the afore-described disadvantages.

SUMMARY OF THE INVENTION

The primary objective of the present invention is to provide a method of forming three-dimensional composite which manufactures the three-dimensional composite easily and quickly at low production cost.

To obtain above-mentioned objective, a method of forming three-dimensional composite provided by the present invention contains steps of:

(a) manufacturing at least one shaping member, wherein each of the at least one shaping member is made of flexible material, and said each shaping member has at least one orifice formed thereon;

(b) fitting said each shaping member on each of at least one mold, wherein said each shaping member covers a peripheral wall of said each mold;

(c) adhering at least on connection sheet on said each shaping member, wherein each of the at least one connection sheet is pre-formed in a predetermined shape and is adhered on said each shaping member so as to form each of at least one semi-finished product, and said each connection sheet has a substrate and an adhesive layer, the adhesive layer is located on a bottom of the substrate, and a melting point of the adhesive layer is less than the substrate;

(d) fixing said each semi-finished product in a cavity; and (e) heating said each semi-finished product and vacuuming the cavity, wherein said semi-finished product in the cavity is heated until the adhesive layer of said each connection sheet melts, and the cavity is vacuumed so that the adhesive layer penetrates into said each shaping member so as to produce a three-dimensional finished product.

DETAILED DESCRIPTION OF THE PREFERRED EMBODIMENTS

With reference to FIGS. 1-7, a method of forming three-dimensional composite according to a first embodiment of the present invention comprises step of:

(a) manufacturing at least one shaping member 10, wherein each of the at least one shaping member 10 is made of flexible material, and the flexible material is any one or any combination of any two or more of elastic fabric, artificial leather, and animal leather, wherein the elastic fabric is any one or any combination of any two or more of knitted fabric, nonwoven fabric, woven fabric, and sandwich mesh/air mesh. Said each shaping member 10 has an orifice 11 formed thereon and is in a sock shape, and said each shaping member 10 is made of at least one yarn 12, wherein each of the at least one yarn 12 is any one of 100% polyester, 100% nylon, 100% cotton, 50% polyester and 50% CD polyester, 50% polyester and 50% nylon, and 50% cotton and 50% polyester. Furthermore, said each shaping member 10 is comprised of multiple flexible material pieces in a sewing manner or in an adhering manner, and said each shaping member 10 may have multiple orifices 11.

Figure 1:
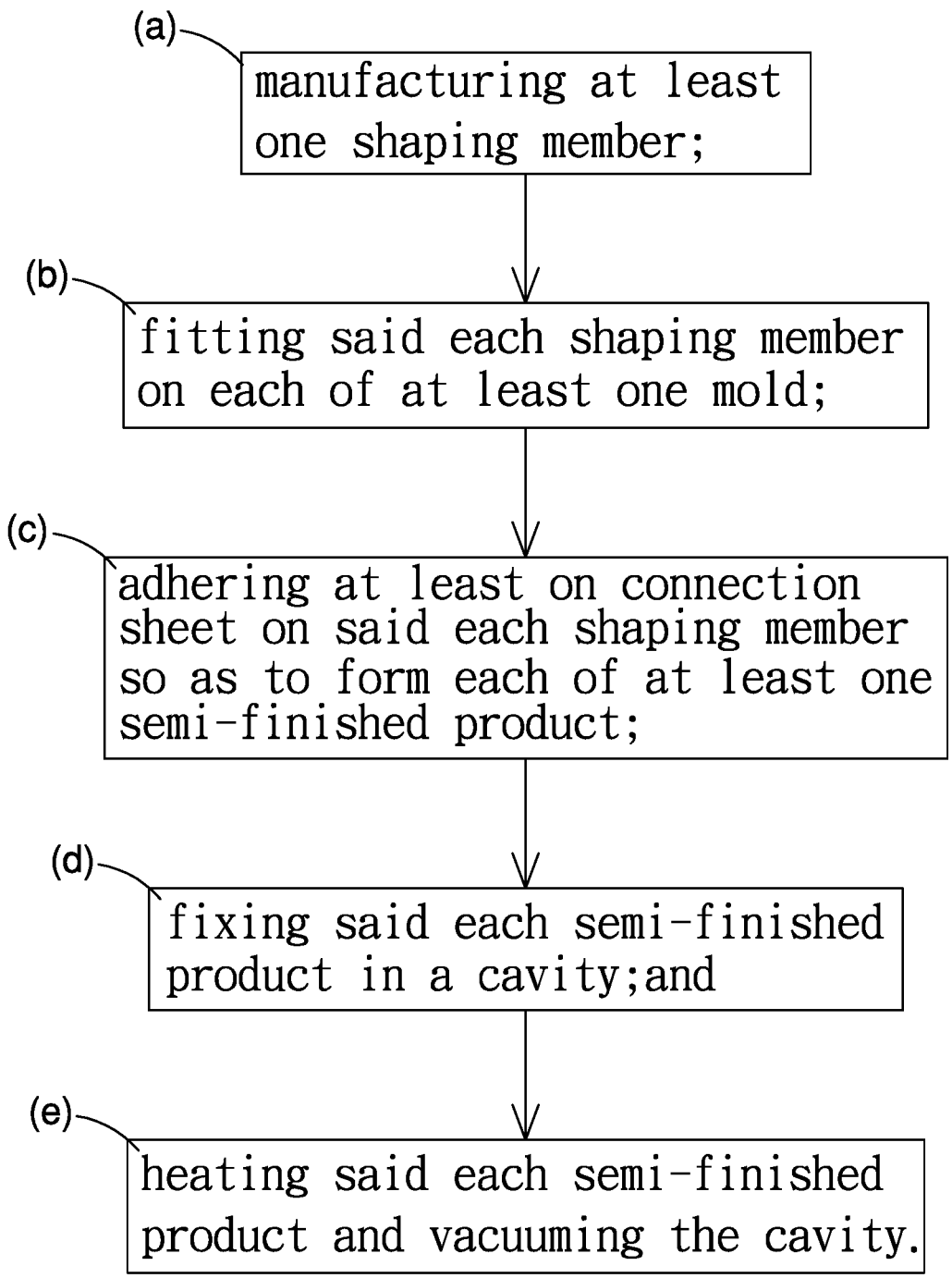
FIG. 1 is a flow chart of a method of forming three-dimensional composite according to a first embodiment of the present invention.
Figure 2:
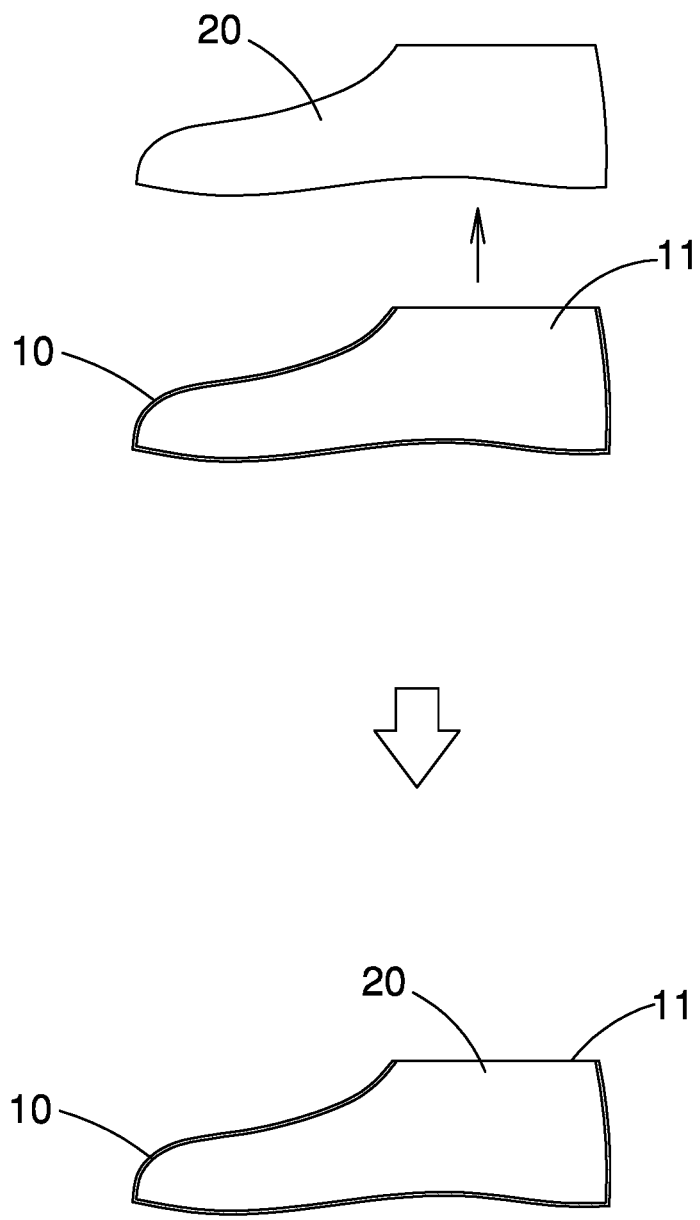
FIG. 2 is a schematic view showing step (b) of the method according to the first embodiment of the present invention.
Figure 3:
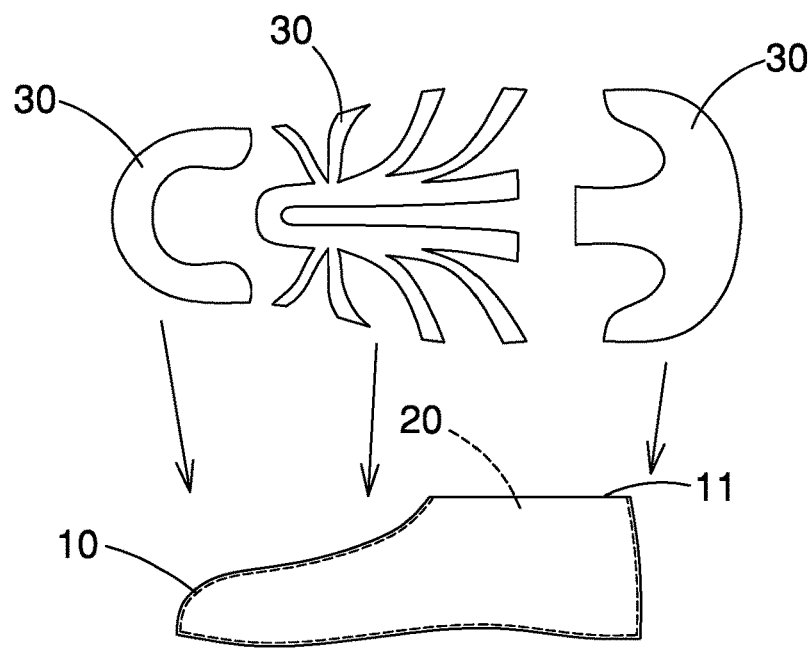
FIG. 3 is a schematic view showing step (c) of the method according to the first embodiment of the present invention.
Figure 3:
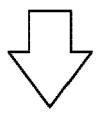
Figure 3:
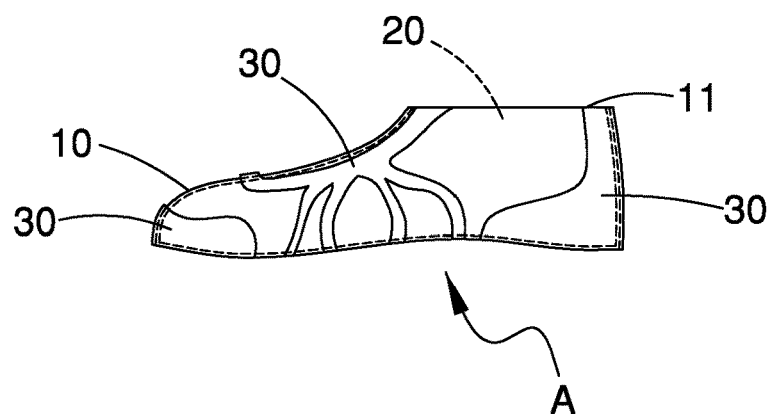
Figure 4:
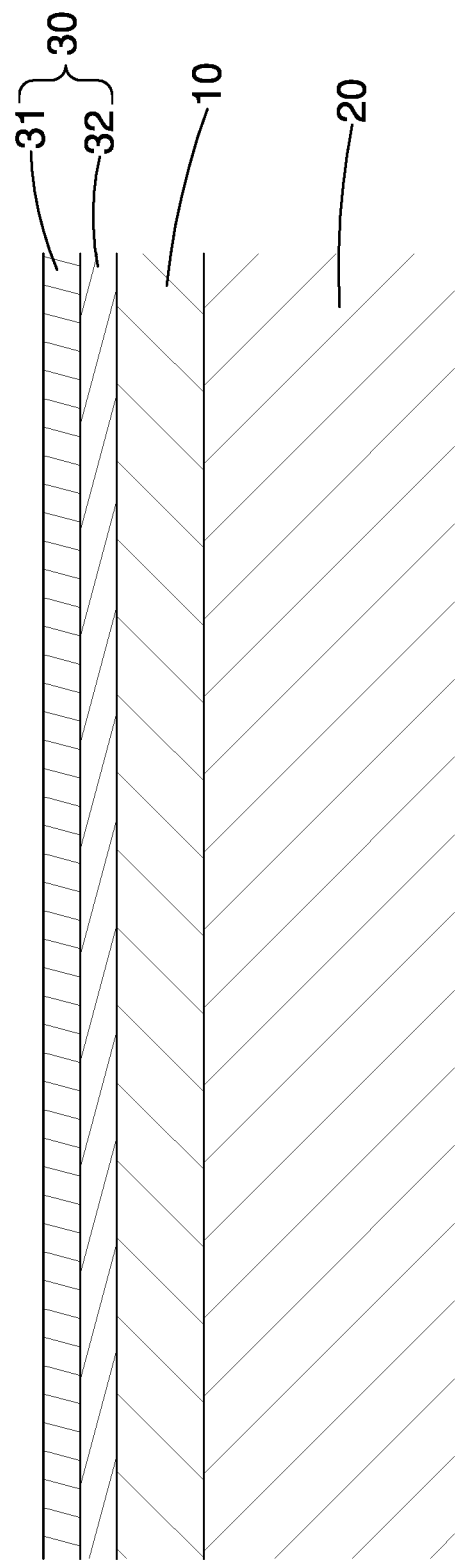
FIG. 4 is an amplified cross sectional view of a part of each semi-finished product according to the first embodiment of the present invention.

The method of the first embodiment also comprises steps of:

(b) fitting said each shaping member 10 on each of at least one mold 20, wherein said each mold 20 is a shoe tree, and said each shaping member 10 covers a peripheral wall of said each mold 20, wherein a top of said each mold 20 exposes outside the orifice 11 of said each shaping member 10, as shown in FIG. 2;

(c) adhering at least on connection sheet 30 on said each shaping member 10, wherein each of the at least one connection sheet 30 is pre-formed in a predetermined shape and is adhered on said each shaping member 10 by way of adhesive agent (such as glue or hot melt adhesive), in a static electricity manner, or in an ultrasound manner so as to form each of at least one semi-finished product A, as illustrated in FIG. 3, wherein said each connection sheet 30 is made by an extruder (not shown) and is thermoplastic composite with a thickness of 0.05 mm to 2.5 mm, wherein the thermoplastic composite is selected from a group consisting of thermoplastic polyurethane (TPU) and styrene butadiene rubber (SBR), thermoplastic polyurethane (TPU) and (styrene ethylene butylene styrene (SEBS), thermoplastic polyurethane (TPU) and thermoplastic rubber (TPR), thermoplastic polyurethane (TPU) and ethylene propylene diene monomer (EPDM), thermoplastic polyurethane (TPU) and thermoplastic polyurethane (TPU) hot melt adhesives, and thermoplastic polyurethane (TPU) and Nylon elastomer, wherein said each connection sheet 30 has a substrate 31 and an adhesive layer 32, a top of the substrate 31 is a plane or has convex and concave patterns, and the adhesive layer 32 is located on a bottom of the substrate 31 and is applied the adhesive agent so as to adhere said each connection sheet 30 on said each shaping member 10, wherein a melting point of the adhesive layer 32 is less than the substrate 31, i.e., the melting point of the adhesive layer 32 is at least 5° C. less than the substrate 31, and a melting point of the adhesive agent applied on said each connection sheet 30 in equal to or less than the adhesive layer 32, as shown in FIG. 4, wherein the substrate 31 is any one or any combination of any two or more of plastic film, fabric, artificial leather, rubber film, and animal leather.

Figure 5:
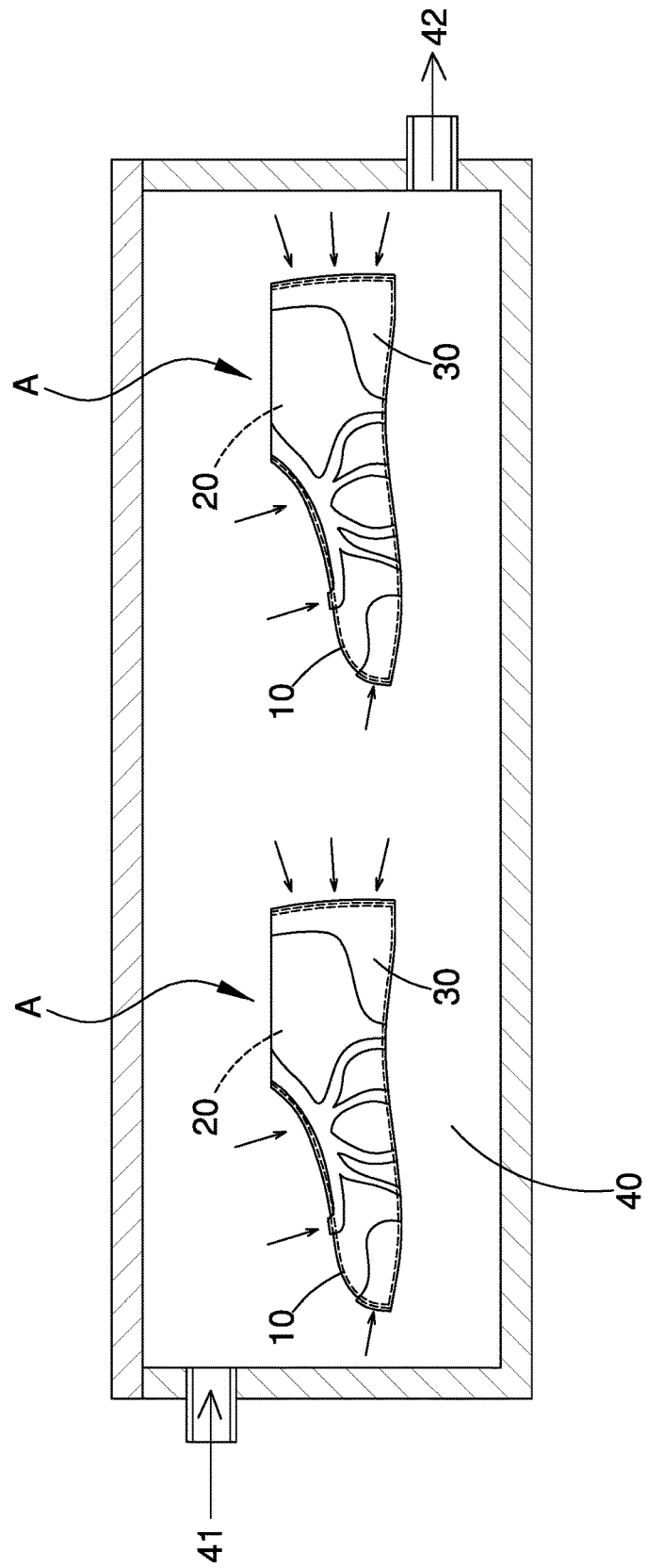
FIG. 5 is a cross sectional view showing steps (d) and (e) of the method according to the first embodiment of the present invention.
Figure 6:
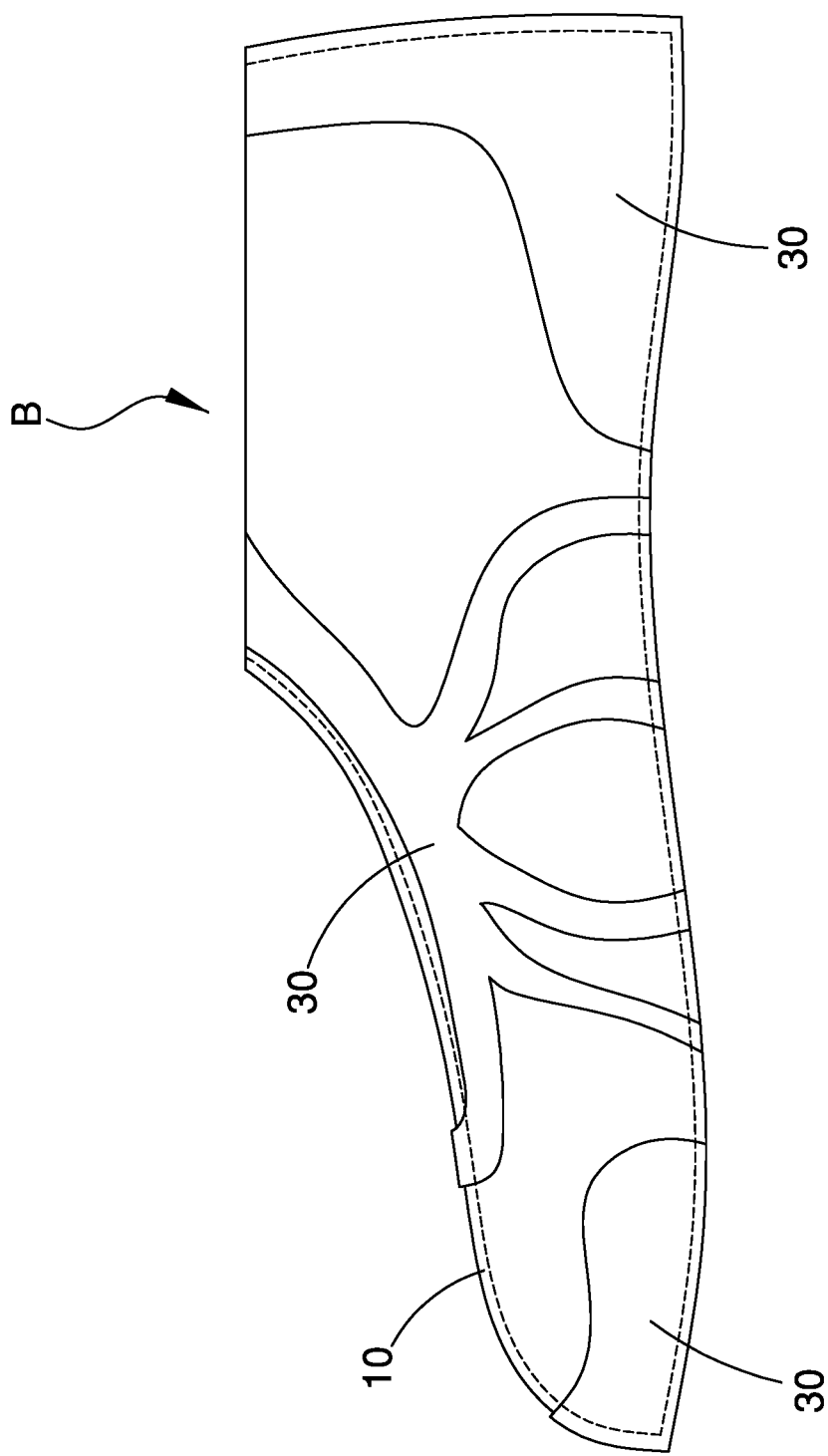
FIG. 6 is an amplified plane view of a three-dimensional finished product according to the first embodiment of the present invention.
Figure 7:
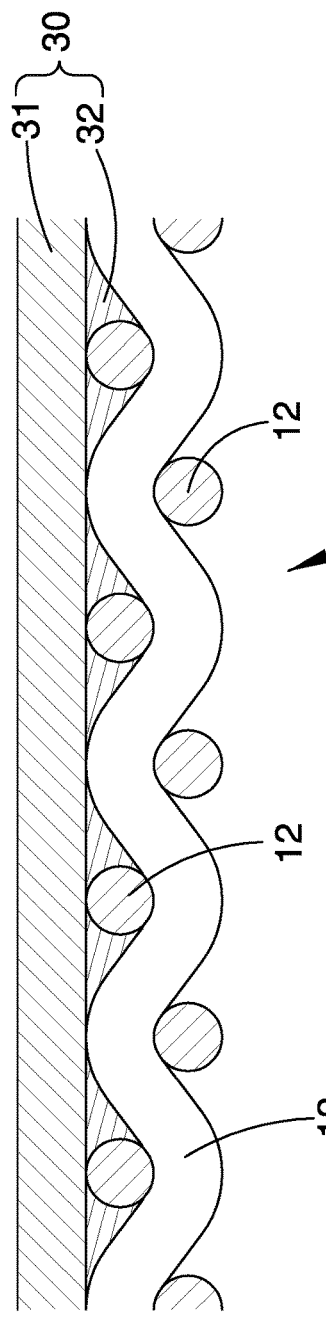
FIG. 7 is a cross sectional view showing the operation of the method according to the first embodiment of the present invention.

(d) fixing said each semi-finished product A in a cavity 40, as illustrated in FIG. 5; and (e) heating said each semi-finished product A and vacuuming the cavity 40, wherein heat gas 41 is fed into the cavity 40 so as to melt the adhesive layer 32 of said each connection sheet 30 on said each semi-finished product A, wherein a vacuum unit (not shown) draws air in the cavity 40 in a vacuuming manner 42 (as shown in FIG. 5) so that said each connection sheet 30 is drawn on said each mold 20 via said each shaping member 10, and the adhesive layer 32 penetrates into said each shaping member 10 so as to produce a three-dimensional finished product B (i.e., the three-dimensional composite), as shown in FIG. 6. Referring to FIG. 7, when said each shaping member 10 is made of the elastic fabric, the adhesive layer 32 melts and penetrates into the at least one yarn 12 and pores of said each shaping member 10, thus connecting said each connection sheet 30 on said each shaping member 10 securely. Preferably, a heater is configured to heat said each semi-finished product A in the cavity 40.

Figure 8:
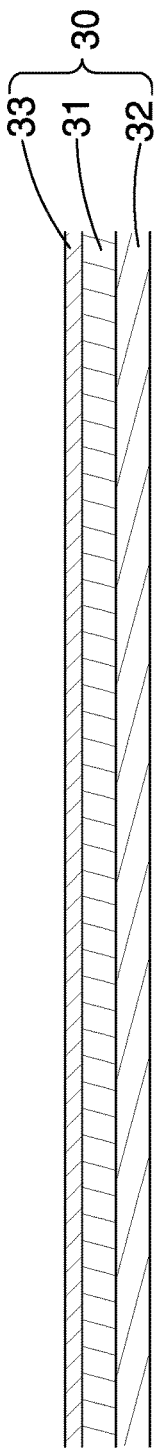
FIG. 8 is a cross sectional view showing the assembly of another connection sheet made by the method according to the first embodiment of the present invention.

With reference to FIG. 8, in another embodiment, said each connection sheet 30 further has a surface layer 33 formed on the top of the substrate 31, and the surface layer 33 is any one of a color layer, a figure layer, and a color pattern layer which are formed in a printing manner, an applying manner, or a plating manner.

Accordingly, said each shaping member 10 is fitted on said each mold 20, said each connection sheet 30 is adhered on said each shaping member 10, and said each shaping member 10 is placed into, heated and vacuumed in the cavity 40 so as to produce the three-dimensional composite easily and quickly at low production cost. The adhesive layer 32 of said each connection sheet 30 on said each semi-finished product A is heated so as to melt, and the cavity 40 is vacuumed so that said each connection sheet 30 is drawn on said each mold 20, and the adhesive layer 32 penetrates into said each shaping member 10, thus connecting said each connection sheet 30 with said each shaping member 10 securely.

Figure 9:
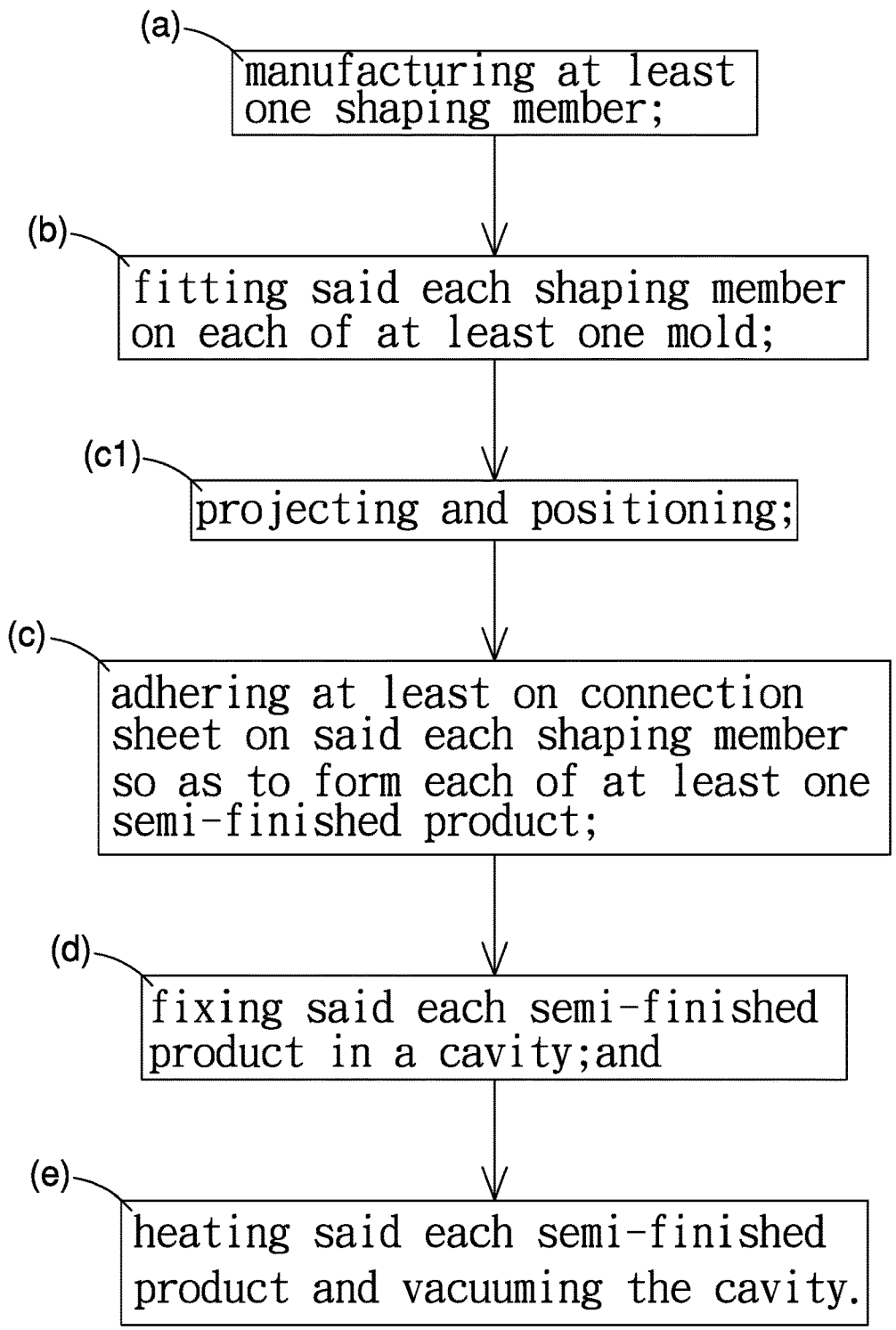
FIG. 9 is a flow chart of a method of forming three-dimensional composite according to a second embodiment of the present invention.
Figure 10:
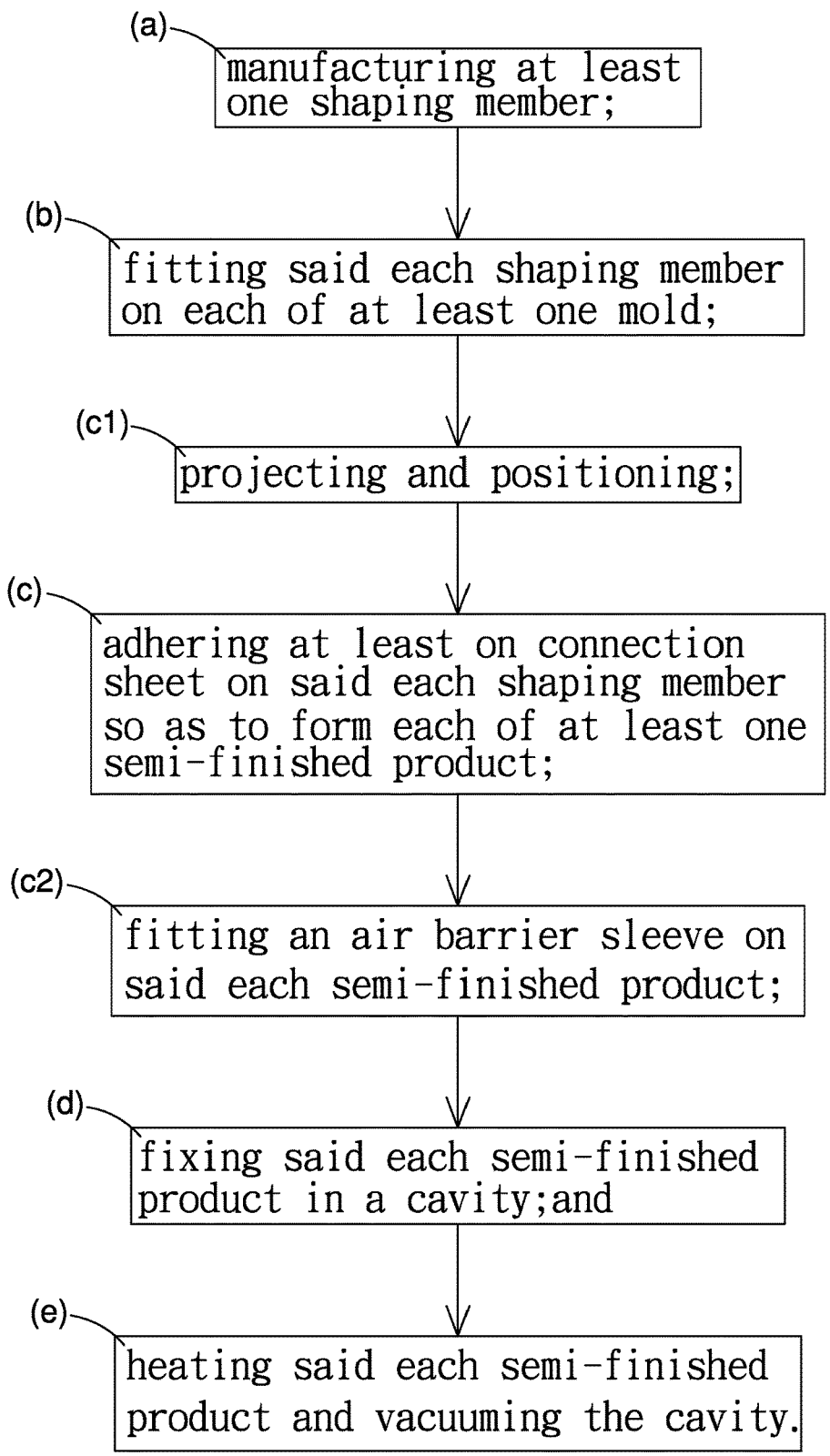
FIG. 10 is a flow chart of a method of forming three-dimensional composite according to a third embodiment of the present invention.
Figure 11:
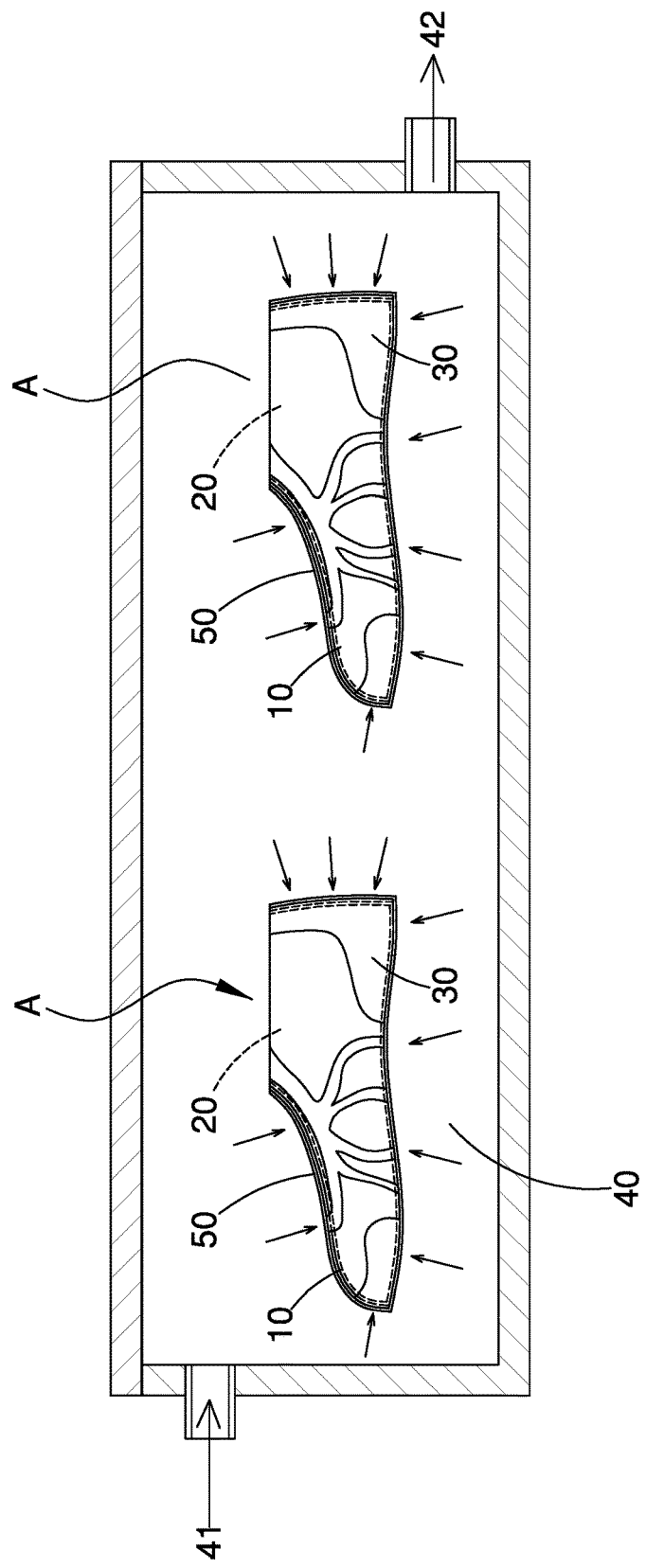
FIG. 11 is a cross sectional view showing steps (d) and (e) of the method according to the second embodiment of the present invention.

With reference to FIG. 9, a difference of a method of forming three-dimensional composite of a second embodiment comprises step of:

(c1) projecting and positioning said each connection sheet 30 on said each shaping member 10, before adhering said each connection sheet 30 on said each shaping member 10 in the step of (c), wherein a shape of said each connection sheet 30 is projected on said each shaping member 10 by using a projector so that said each connection sheet 30 is adhered on said each shaping member 10 based on the shape of said each connection sheet which is projected on said each shaping member 10.

Figure 12:
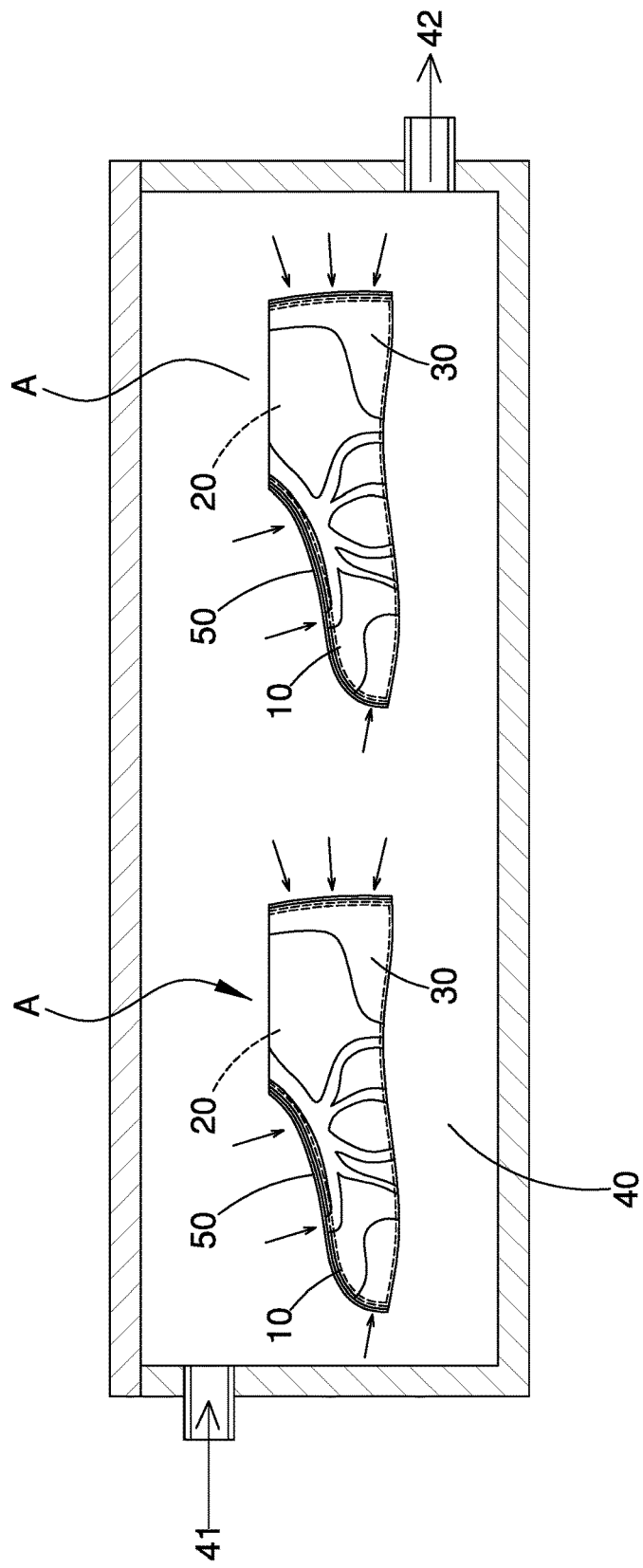
FIG. 12 is a cross sectional view showing the operation of the method according to the second embodiment of the present invention.

Referring to FIG. 12, a difference of a method of forming three-dimensional composite of a third embodiment comprises step of:

(c2) fitting an air barrier sleeve 50 on said each semi-finished product A, after adhering said each connection sheet 30 on said each shaping member 10 in the step of (c), wherein the air barrier sleeve 50 has an opening and a melting point of the air barrier sleeve 50 is more than the substrate 31, wherein the air barrier sleeve 50 is fitted on said each semi-finished product A, such that the air barrier sleeve 50 covers a peripheral wall and a bottom of said each semi-finished product A, and the top of said each mold 20 exposes outside the opening of the air barrier sleeve 50. Thereafter, said each semi-finished product A is fixed in the cavity 40 in the step of (d).

Thereby, in the step of (e), said each semi-finished product A is heated, and the cavity 40 is vacuumed so as to draw air in the air barrier sleeve 50 out of the opening, and a negative pressure forms between said each mold 20 and the air barrier sleeve 50, hence the air barrier sleeve 50 is drawn downwardly by the negative pressure so as to press said each connection sheet 30, and the adhesive layer 32 penetrates into said each shaping member 10, and said each connection sheet 30 is connected with said each shaping member 10 securely. Preferably, the air barrier sleeve 50 is made any one of rubber, silicone and flexible material.

In another embodiment, the air barrier sleeve 50 has a first opening and a second opening opposite to the first opening, wherein the top of said each mold 20 exposes outside the first opening of the air barrier sleeve 50, and a bottom of said shaping member 10 of said each semi-finished product 10 exposes outside the second opening of the air barrier sleeve 50. Thereby, in the step of (e), said each semi-finished product A is heated, and the cavity 40 is vacuumed so that air in the air barrier sleeve 50 is drawn out of the first opening and the second opening of the air barrier sleeve 50. In addition, the air barrier sleeve 50 is adhered on said each connection sheet 30.

Figure 13:
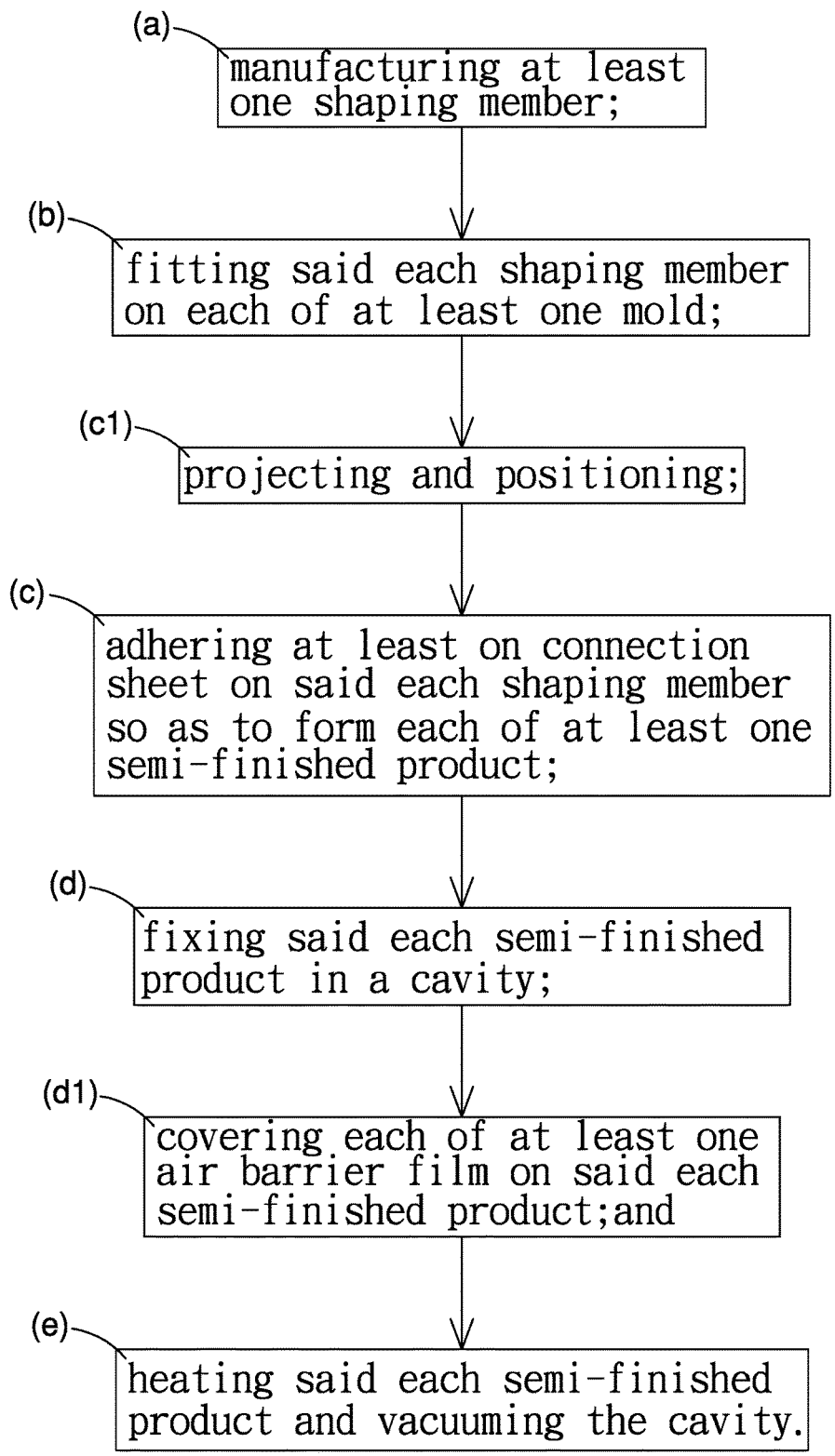
FIG. 13 is a flow chart of a method of forming three-dimensional composite according to a fourth embodiment of the present invention.
Figure 14:
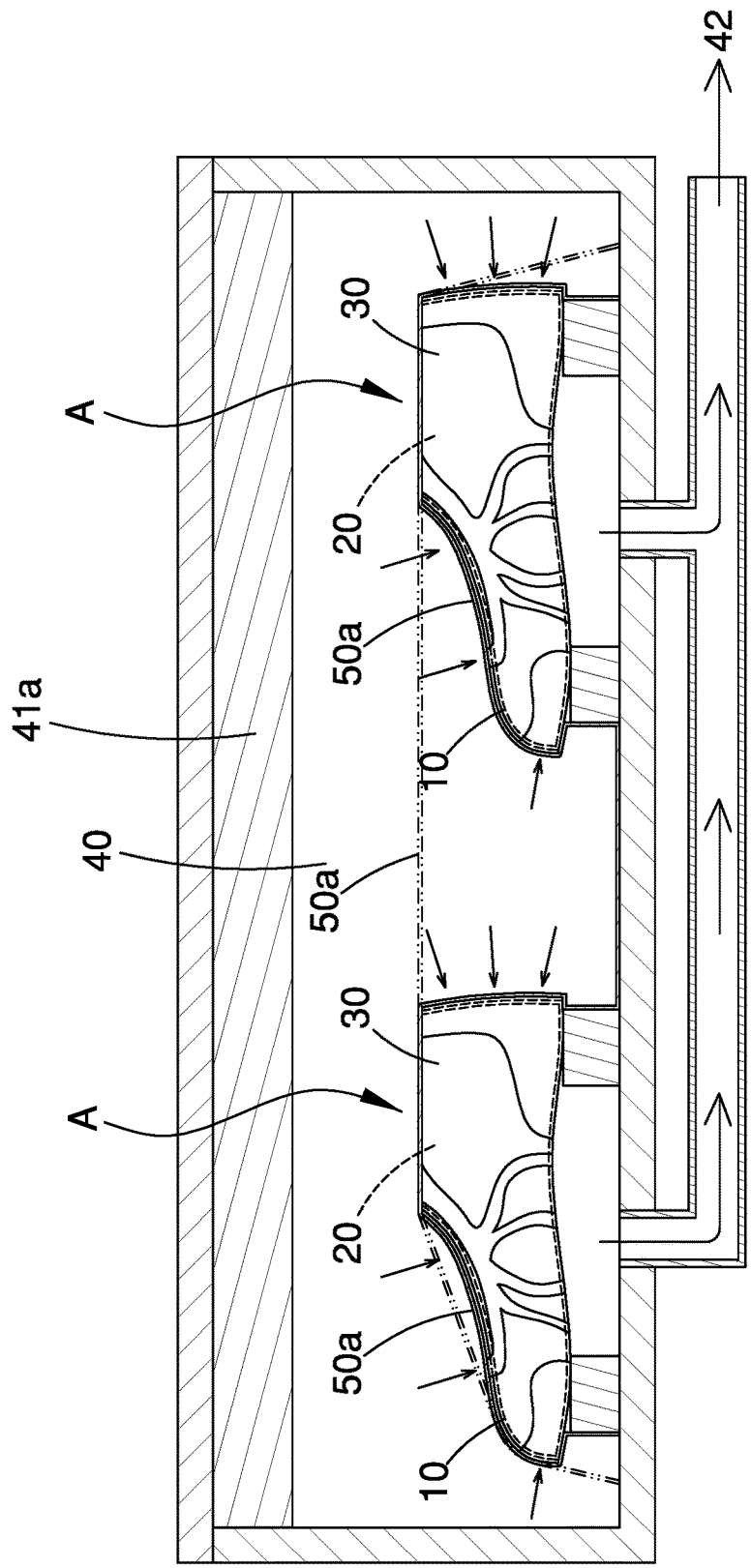
FIG. 14 is a cross sectional view showing steps (d1) and (e) of the method according to the fourth embodiment of the present invention.

Referring to FIGS. 13 and 14, a difference of a method of forming three-dimensional composite of a fourth embodiment comprises:

executing the step of (d) and step of (d1), after adhering said each connection sheet 30 on said each shaping member 10 in the step of (c), wherein in the step of (d), said each semi-finished product A is fixed in the cavity 40, and in the step of (d1), each of at least one air barrier film 50a is covered on said each semi-finished product A, and a melting point of said each air barrier film 50a is higher than the substrate 32. Thereafter, in the step of (e), said each semi-finished product A is heated, and said each air barrier film 50a is vacuumed, wherein a heater 41a heats said each semi-finished product A under said each air barrier film 50a until the adhesive layer 32 of said each connection sheet 30 of said each semi-finished product A melts, and a vacuum unit (not shown) draws air in said each air barrier film 50a in a vacuuming manner 42 (as shown in FIG. 14), hence a negative pressure forms between said each mold 20 and said each air barrier film 50a, and said each air barrier film 50a is drawn downwardly by the negative pressure so as to press said each connection sheet 30, and the adhesive layer 32 penetrates into said each shaping member 10, thus connecting said each connection sheet 30 with said each shaping member 10 securely. Preferably, said each air barrier film 50a is made any one of rubber, silicone and flexible material. In addition, said each semi-finished product A in the cavity 40 is heated by a hot gas.

Figure 15:
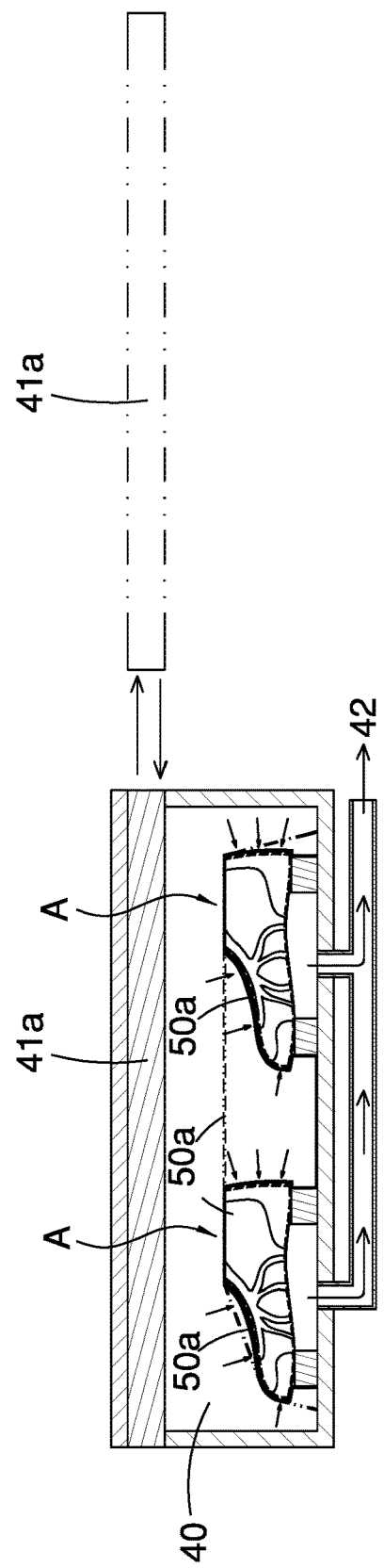
FIG. 15 is a cross sectional view showing the operation of the method according to the fourth embodiment of the present invention.

Referring to FIG. 15, in another embodiment, a heater 41a is movable.

Preferably, the method of the present invention is applicable for forming a purse or a hat.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of forming three-dimensional composite comprising steps of:
    (a) manufacturing at least one shaping member, wherein each of the at least one shaping member is made of flexible material, and said each shaping member has at least one orifice formed thereon;
    (b) fitting said each shaping member on each of at least one mold, wherein said each shaping member covers a peripheral wall of said each mold;
    (c) adhering at least on connection sheet on said each shaping member, wherein each of the at least one connection sheet is pre-formed in a predetermined shape and is adhered on said each shaping member so as to form each of at least one semi-finished product, and said each connection sheet has a substrate and an adhesive layer, the adhesive layer is located on a bottom of the substrate, and a melting point of the adhesive layer is less than the substrate;
    (d) fixing said each semi-finished product in a cavity; and
    (e) heating said each semi-finished product and vacuuming the cavity, wherein said semi-finished product in the cavity is heated until the adhesive layer of said each connection sheet melts, and the cavity is vacuumed so that the adhesive layer penetrates into said each shaping member so as to produce a three-dimensional finished product.

2. The method as claimed in claim 1 further comprising step of (c1) projecting and positioning said each connection sheet on said each shaping member, before adhering said each connection sheet on said each shaping member in the step of (c), wherein a shape of said each connection sheet is projected on said each shaping member by using a projector so that said each connection sheet is adhered on said each shaping member based on the shape of said each connection sheet which is projected on said each shaping member.

3. The method as claimed in claim 1, wherein the flexible material is any one or any combination of any two or more of elastic fabric, artificial leather, and animal leather.

4. The method as claimed in claim 3, wherein the elastic fabric is any one or any combination of any two or more of knitted fabric, nonwoven fabric, woven fabric, and sandwich mesh/air mesh.

5. The method as claimed in claim 1, wherein said each mold is a shoe tree, and said each shaping member is in a sock shape and is comprised of multiple flexible material pieces.

6. The method as claimed in claim 1, wherein said each connection sheet is adhered on said each shaping member by way of adhesive agent, in static electricity manner, or in an ultrasound manner, wherein a melting point of the adhesive layer of said connection sheet is at least 5° C. less than the substrate of said each connection sheet.

7. The method as claimed in claim 1, wherein said each semi-finished product is heated by feeding hot gas into the cavity or by using a heater.

8. A method of forming three-dimensional composite comprising steps of:
    (a) manufacturing at least one shaping member, wherein each of the at least one shaping member is made of flexible material, and said each shaping member has at least one orifice formed thereon;
    (b) fitting said each shaping member on each of at least one mold, wherein said each shaping member covers a peripheral wall of said each mold;
    (c) adhering at least on connection sheet on said each shaping member, wherein each of the at least one connection sheet is pre-formed in a predetermined shape and is adhered on said each shaping member so as to form each of at least one semi-finished product, and said each connection sheet has a substrate and an adhesive layer, the adhesive layer is located on a bottom of the substrate, and a melting point of the adhesive layer is less than the substrate;
    (c2) fitting an air barrier sleeve on said each semi-finished product, wherein the air barrier sleeve has at least one opening and is fitted on said each semi-finished product, a melting point of the air barrier sleeve is more than the substrate;
    (d) fixing said each semi-finished product in the a cavity; and
    (e) heating said each semi-finished product and vacuuming the cavity, wherein said semi-finished product in the cavity is heated until the adhesive layer of said each connection sheet melts, and the cavity is vacuumed so that a negative pressure forms between said each mold and the air barrier sleeve, hence the air barrier sleeve is drawn downwardly by the negative pressure so as to press said each connection sheet, and the adhesive layer penetrates into said each shaping member, thus connecting said each connection sheet with said each shaping member.

9. The method as claimed in claim 8 further comprising step of (c1) projecting and positioning said each connection sheet on said each shaping member, before adhering said each connection sheet on said each shaping member in the step of (c), wherein a shape of said each connection sheet is projected on said each shaping member by using a projector so that said each connection sheet is adhered on said each shaping member based on the shape of said each connection sheet which is projected on said each shaping member.

10. The method as claimed in claim 8, wherein the air barrier sleeve has an opening, and a top of said each mold exposes outside the opening of the air barrier sleeve.

11. The method as claimed in claim 8, wherein the air barrier sleeve has a first opening and a second opening opposite to the first opening, wherein a top of said each mold exposes outside the first opening of the air barrier sleeve, and a bottom of said shaping member of said each semi-finished product exposes outside the second opening of the air barrier sleeve.

12. The method as claimed in claim 8, wherein the flexible material is any one or any combination of any two or more of elastic fabric, artificial leather, and animal leather.

13. The method as claimed in claim 12, wherein the elastic fabric is any one or any combination of any two or more of knitted fabric, nonwoven fabric, woven fabric, and sandwich mesh/air mesh.

14. The method as claimed in claim 8, wherein said each mold is a shoe tree, and said each shaping member is in a sock shape and is comprised of multiple flexible material pieces.

15. The method as claimed in claim 8, wherein said each connection sheet is adhered on said each shaping member by way of adhesive agent, in static electricity manner, or in an ultrasound manner, wherein a melting point of the adhesive layer of said connection sheet is at least 5° C. less than the substrate of said each connection sheet.

16. The method as claimed in claim 8, wherein said each semi-finished product is heated by feeding hot gas into the cavity or by using a heater.

* * * * *